United States Patent [19]
Daniels

[11] Patent Number: 5,029,385
[45] Date of Patent: Jul. 9, 1991

[54] WHEEL ASSEMBLY APPARATUS
[75] Inventor: John F. Daniels, Windsor, Canada
[73] Assignee: General Motors Corporation, Detroit, Mich.
[21] Appl. No.: 628,137
[22] Filed: Dec. 17, 1990
[51] Int. Cl.$^5$ .............................................. B23P 19/00
[52] U.S. Cl. ................................ 29/802; 29/894.322; 29/525
[58] Field of Search .................... 29/802, 894.322, 525

[56] References Cited
U.S. PATENT DOCUMENTS

| | | | |
|---|---|---|---|
| 4,733,448 | 3/1988 | Daudi | 29/802 |
| 4,841,622 | 6/1989 | Murano et al. | 29/889.22 |

Primary Examiner—P. W. Echols
Attorney, Agent, or Firm—Herbert Furman

[57] ABSTRACT

A wheel assembly apparatus for force fitting a wheel disc within a wheel rim by fixedly locating the wheel rim, fixing the relationship of the center portion and flange portions of the wheel disc to each other, and applying a uniform force to such portions of the wheel disc to force fit the flange portions within the drop center flange of the wheel rim while maintaining the center portion of the wheel disc in a plane parallel to a plane of the terminal flange of the wheel rim to provide a vehicle wheel with minimum lateral runout.

6 Claims, 5 Drawing Sheets

WHEEL ASSEMBLY APPARATUS

BACKGROUND OF THE INVENTION

This invention relates to an apparatus for assembling vehicle wheels and more particularly to an apparatus for assembling a wheel disc within a wheel rim.

It is common in the manufacture of vehicle wheels to assemble the wheel disc within the wheel rim after the parts have been separately manufactured. The wheel disc is formed in a stamping operation from a generally square blank of metal and includes a center portion containing the bolt holes and axle hole and a circular outer edge portion having a plurality of axially extending circular flange portions formed from the corner portions of the blank. The axial terminal edges of the axially extending flange portions of the wheel disc lie in radial planes which are located at varying axial distances from the plane of the center portion of the wheel disc. The wheel rim is formed in a rolling operation from a welded ring of coil metal stock. It includes the usual outer or terminal flanges, tire bead seat flanges, and a drop center flange.

It is known to assemble vehicle wheels by force fitting the axially extending flange portions of the wheel disc within the drop center flange of the rim. In such an operation, the wheel rim is located in a horizontal position, the center portion of the wheel disc is located within the opening of the drop center rim flange, and force is applied to the center portion to force fit the flange portions of the wheel disc within the drop center flange. Since the wheel rim drop center flange and/or one or more of the wheel disc flange portions may be out of round, have galled areas, or have dirt or grit thereon, increased localized frictional resistance between the drop center flange and the annular flange portions can result during force fitting of the wheel disc within the wheel rim. This increased localized frictional resistance can cause the wheel disc center portion and flange portions to flex or twist relative to each other during force fitting so that the plane of the center portion is not parallel to the plane of a wheel rim terminal flange after assembly of the wheel disc within the wheel rim. This non-parallel relationship results in lateral runout which exceeds predetermined limits.

Murano et al U.S. Pat. No. 4,841,622, Apparatus For Interference-Fitting An Inner Member With An Annular Outer Member, discloses the force fitting of a wheel rim over a wheel disc while supporting the center portion of the wheel disc and the axially extending circular flange portions of the wheel disc. In Murano, the center portion of the wheel disc is fixedly supported on a press bed. The flange portions of the wheel disc are initially floatingly supported by air cylinders engaging the edges thereof. The air cylinders compensate for the varying axial extent of these flange portions. After the center portion is clamped against the fixed support, a valve in the air supply to the air cylinders is closed prior to force fitting the drop center flange of the wheel rim over the flange portions of the wheel disc. As previously mentioned, the flange portions of the wheel disc and/or the drop center flange of the wheel rim may be out of round or have galled areas or may have dirt or grit thereon so as to result in increased localized frictional resistance during force fitting of the wheel rim and wheel disc. Since air is compressible, the force resulting from this increased localized frictional resistance will axially compress one or more of the air cylinders and permit flexing or twisting of the center portion of the wheel disc relative to the flange portions during force fitting of the wheel rim over the flange portions of the wheel disc. This distortion of the center portion of the wheel disc would result in lateral runout problems. Additionally, while the Murano et al apparatus purports to be able to assemble the wheel disc within the wheel rim, this is impossible.

The wheel assembly apparatus of this invention force fits a wheel disc within a wheel rim to provide a vehicle wheel with minimum lateral runout. The apparatus provides minimum lateral runout vehicle wheels on a mass production basis while overcoming increased localized frictional resistance resulting from wheel discs and wheel rims which are out of round, have galled areas or have dirt or grit on their interfitted flange portions and drop center flange.

In the preferred embodiment of the invention, the terminal flange of the wheel rim is seated on a wheel rim support, such as a continuous or segmented ring, which is fixed to a main support, such as a press bed, and defines a fixed horizontal plane. A movable wheel disc support is mounted on the main support and extends axially through the wheel rim support and wheel rim. The wheel disc support defines a horizontal plane parallel to the plane of the wheel rim support and seats the axially outer face of the center portion of the wheel disc. The wheel disc support includes suitable guide pins to receive the bolt and/or axle openings of the wheel disc and orient the wheel disc relative to the rim, such as to the valve stem opening. Movement of the movable wheel disc support relative to the main support is resisted by springs or air cylinders. The axially extending flange portions of the wheel disc extend axially away from the center portion of the wheel disc.

A ram is movably mounted on the main support for vertical movement between a raised position, out of engagement with the axially inner face of the wheel disc center portion, and a lowered position in engagement with such axially inner face, generally opposite the wheel disc support to clamp the center portion therebetween. The ram defines a horizontal plane parallel to the plane of the wheel rim support and to the plane of the wheel disc support. A slide respective to each axially extending wheel disc flange portion is slidably mounted on the ram and connected to the piston of a hydraulic cylinder, also mounted to the ram. The hydraulic cylinders are connected to a source of hydraulic fluid and a valve controls the flow of fluid into and out of one side of each cylinder. When the valves are open, the slides and pistons are freely extendible and retractable relative to the ram. When the valves are closed, the slides and pistons are unitized with the ram despite compression forces thereon since hydraulic fluid is incompressible.

To assemble a wheel disc within a wheel rim, the wheel rim is seated on the wheel rim support and the center portion of the wheel disc is seated on the wheel disc support. The ram is in the raised position and the valves are open so that the pistons are freely movable relative to the cylinders and the slides are gravity extended relative to the ram. The ram is then initially lowered or moved toward the wheel disc. This will engage the gravity extended slides with the axial terminal edges of respective wheel disc flange portions. The pistons thereafter move within their respective cylinders and the slides retract relative to the ram as the ram continues to be lowered into engagement with the wheel disc center portion. All of the slides will not engage the axial terminal edges of their respective flange portions at the same time since such terminal edges do not all lie in the same radial plane due to manufacturing tolerances. When the ram engages the axially inner face of the wheel disc center portion, it clamps or holds the wheel disc center portion against the wheel disc support to locate such center portion in a plane parallel to the plane of the wheel rim support. Upon such engagement, the valves are closed to lock the slides and their pistons relative to the cylinders and ram so that the slides and ram are unitized and can thereafter apply a uniform pushing force on the center portion of the wheel disc and on the flange portions. This will prevent such portions of the wheel disc from flexing or distorting relative to each other, either during the force fitting operation or thereafter due to metal springback.

Thereafter, the ram, wheel disc, and wheel disc support are lowered or moved toward the wheel rim against the resistance of the springs or air cylinder of the wheel disc support. As this movement continues, the flange portions of the wheel disc will be force fitted within the drop center flange of the wheel rim. Since the slides are unitized with the ram and the center portion of the wheel disc cannot move relative to such flange portions, the wheel disc moves within the wheel rim drop center flange without twisting or flexing and with the center portion of the wheel disc being maintained in a plane parallel to the plane of the wheel rim support. Thus, the assembled wheel has the wheel rim thereof and wheel disc center portion thereof located in planes parallel to each other to reduce lateral runout to a minimum.

Should the wheel rim not lie flush against the wheel rim support so as not to be coplanar with the plane of such support, the initial frictional engagement of the flange portions of the wheel disc with the drop center flange will force the wheel rim into coplanar relationship with the plane of the wheel rim support.

Since it is impossible for the wheel disc center portion and flange portions to move relative to each other, the interference tolerance between the flange portions and the drop center flange of the wheel rim can be increased to increase the strength of the wheel. This also allows the wheel rim to be made of reduced thickness metal. Additionally, out of round or galled areas of the wheel disc flange portions or drop center flange or dirt or grit therebetween cannot affect the assembly of the wheel disc within the wheel rim or the maintenance of a parallel planar relationship therebetween.

Therefore, the primary feature of this invention is that it provides a wheel assembly apparatus which force fits a wheel disc within a wheel rim to provide a vehicle wheel with minimum lateral runout. Another feature is that a parallel planar relationship of the center portion of the wheel disc to the terminal flange of the wheel rim is established and maintained as the wheel disc is force fitted within the wheel rim. A further feature is that the relationship of the center portion of the wheel disc to the flange portions thereof is fixed and maintained despite high localized frictional resistance forces attempting to flex or distort these parts of the wheel disc relative to each other during force fitting of the wheel disc within the wheel rim. Yet another feature is that high localized frictional resistance forces resulting from galling or out of round areas of the wheel disc flange portions and/or wheel rim drop center flange or dirt or grit thereon are accommodated without sacrificing maintenance of the parallel planar relationship between the center portion of the wheel disc and the terminal flange of the wheel rim during assembly of the wheel disc within the wheel rim.

These and other features of the invention will be readily apparent from the following specification and drawings wherein.

Figure 1:
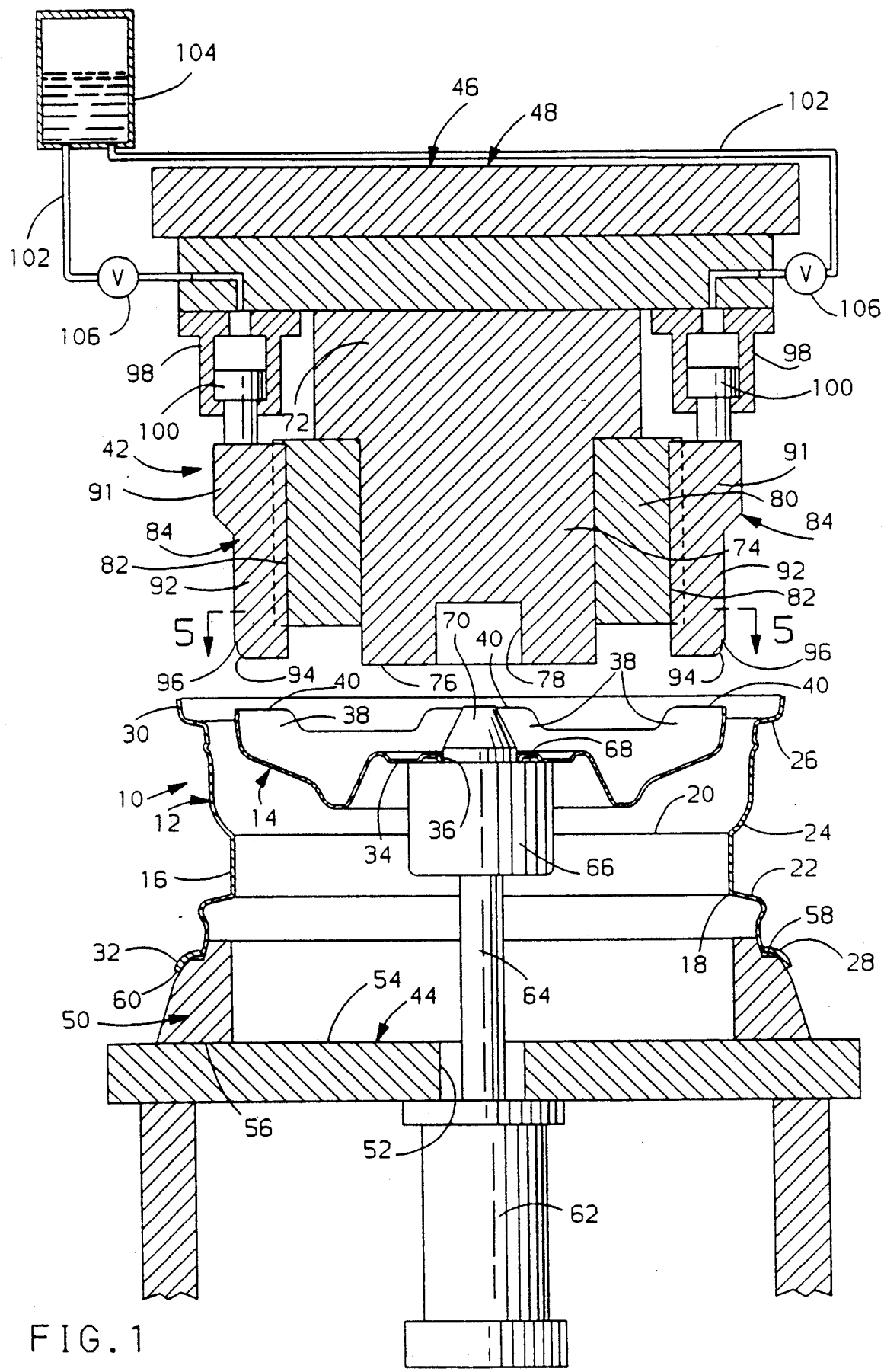
FIG. 1 is a sectional view of an apparatus according to this invention, with the apparatus being shown in the first position in the assembly sequence.

Referring now to the drawings, a conventional vehicle wheel designated 10 is comprised of a wheel rim 12 and a wheel disc 14. The wheel rim 12 includes a drop center flange 16 joined across shoulders 18 and 20 and flanges 22 and 24 to tire bead seats 26 and 28. The tire bead seats terminate in outer or wheel rim terminal flanges 30 and 32. The wheel rim is made by first forming a welded ring from steel coil stock and then roll forming the flanges and tire bead seats thereof. The wheel disc 14 includes a center planar portion 34 having a center axle opening 36 and a plurality of bolt hole openings, not shown, arranged in spaced relationship around the opening 36. The wheel disc further includes four axially extending circular flange portions 38 having axial terminal edges 40. The wheel disc is formed in a stamping operation from a square blank of metal and the flange portions are normally formed from the corner portions of the blank. The axial terminal edges 40 do not all lie in the same transverse or radial plane due to manufacturing tolerances. When assembled, the flange portions 38 of the wheel disc 14 are force fitted within the drop center flange 16 of the wheel rim 12 by an apparatus 42 according to this invention. After such assembly, the axial terminal edges 40 of the wheel disc are welded, either continuously or partially, to the drop center flange 16 to complete the assembly of the wheel 10.

The apparatus 42 will now be described with reference to FIGS. 1 through 5 of the drawings. The apparatus is intended to be mounted to the bed 44 and ram 46 of a conventional press 48. The details of the press form no part of this invention and are therefore not described.

The apparatus 42 includes a wheel rim support 50 which is mounted on the press bed 44 around an opening 52 therethrough. The support 50 is shown as a continuous ring, although it may be segmented if so desired. The upper surface 54 of the press bed 44 is located in a horizontal plane to locate the lower surface 56 of the support 50 coplanar therewith. The support 50 includes an arcuately shaped portion 58 which matches and seats the terminal flange 32 of the wheel rim 12 and locates such flange and particularly the edge 60 thereof in a horizontal plane parallel to the planes of surfaces 54 and 56. An air cylinder 62 is mounted to the lower surface of press bed 44 and includes a piston, not shown, having a circular piston rod 64 extending upwardly through opening 52 and mounting a wheel disc support 66 at its upper end. The air cylinder is connected to a source of compressed air, not shown, across control valves, not shown, which control the exhaust of compressed air from the air cylinder so that downward movement of the piston rod 64 is resisted by the compression of the compressed air within the cylinder by the piston. Alternatively, the air cylinder 62 could be replaced by compression springs to resist downward movement of the piston rod 64.

The wheel disc support 66 includes an upper planar surface 68 which is parallel to the planes of the surfaces 54 and 56 and to the plane of the edge 60 of the wheel rim terminal flange 32. The surface 68 seats the axially outer surface of the wheel disc center portion 34. Extending upwardly from surface 68 is a pilot 70 received within the axle opening 36 of the wheel disc 14 and one or more bolt hole pilots, not shown, received within bolt holes of the wheel disc to orient the wheel disc 14 relative to the wheel rim 12 and particularly relative to the tire valve stem opening, not shown, of the wheel rim. Thus, as shown in FIG. 1, when the wheel disc is initially seated on the wheel disc support 66, it is located coaxially with the wheel rim and within the tire bead seat 26 thereof. The center planar portion 34 of the wheel disc 14 is located in a plane parallel to the horizontal and to the plane of the edge 60 of the terminal flange 32 of the wheel rim 12. The flange portions 38 extend axially upwardly or away from the wheel rim 12. The wheel disc support 66 is at its extended position relative to the press bed.

The circular base 72 of a generally circular wheel disc ram 74 is mounted to the press ram 46 in a conventional manner. The wheel disc ram 74 has a lower planar surface 76 which is of the same general area as the center planar portion 34 of the wheel disc 14 and lies in a horizontal plane parallel to that of the upper surface 68 of the wheel disc support 66. The wheel disc ram 74 includes a central circular axial bore 78 which extends axially upwardly from the surface 76 and receives the pilot 70 as will be described.

Figure 5:
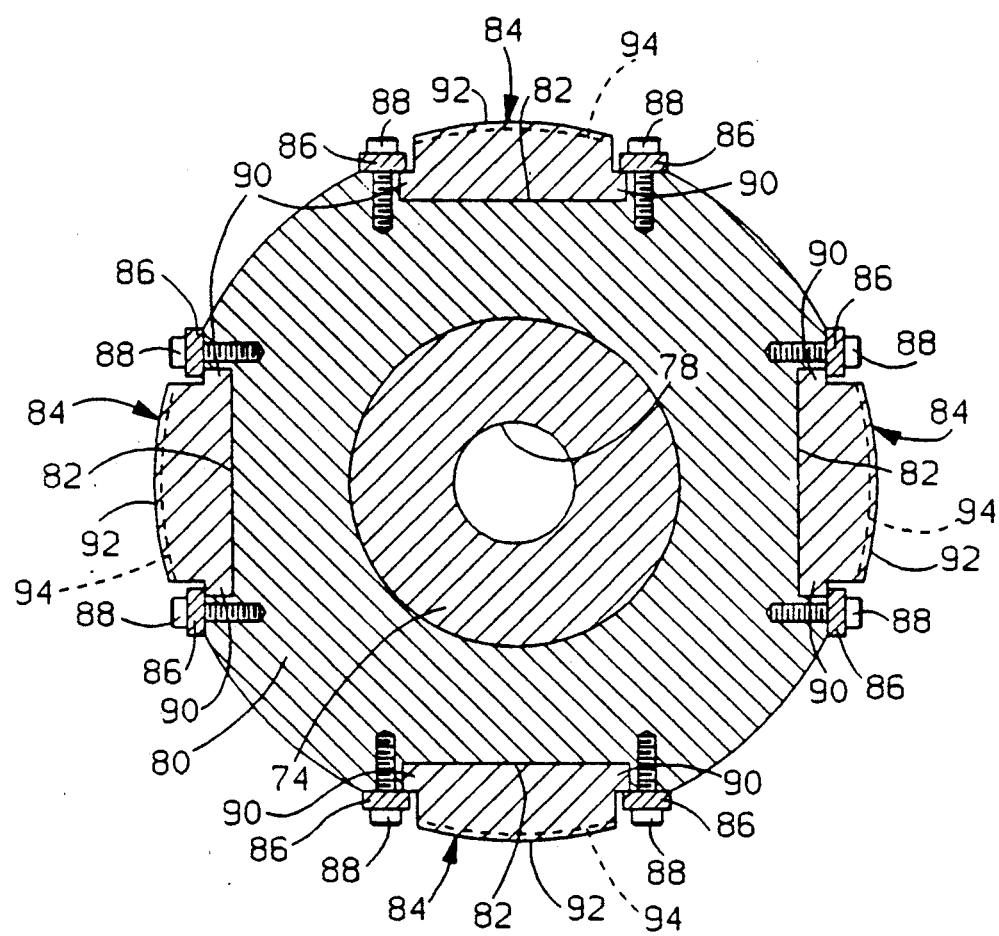

As shown in FIG. 5, a slide mounting circular ring 80 surrounds and is suitably secured to the wheel disc ram 74. The mounting ring 80 has four circumferentially equidistant axially extending slots 82 in the outer surface thereof, each receiving a respective slide 84. Each slide 84 is slidably retained in a slot 82 by a pair of axially extending retainers 86, each bolted at 88 to the ring 80 to one side of a slot 82 and overlying a longitudinal flange 90 of the slide. The outer surfaces of the slides 84 are circular and stepped to provide an upper portion 91 and a lower portion 92. The lower portions 92 lie on a circle having a diameter slightly smaller than that of the drop center flange 16 of the wheel rim 14 so as to be non-engageably received therein as will be described. Each lower portion 92 has an outwardly opening groove or slot 94 in the lower outer edge thereof. The upper edge 96 of each groove lies in a horizontal plane parallel to the plane of surface 76 of the wheel disc ram 72. Each slide 84 is respective to an edge 40 of a flange portion 38 of the wheel disc 14. Although one slide for each edge 40 is shown, multiple slides for each edge may be provided if desired. The upper edge 96 of a slide may engage all or only a part of the edge 40 of a flange portion 38.

Four hydraulic cylinders 98 are mounted to the press ram 46, each respective to a slide 84. The piston 100 of each hydraulic cylinder is suitably connected to a respective upper portion 91 of a slide 84. Each piston is connected by conventional hydraulic supply lines 102 to an air over oil surge tank 104. A conventional solenoid valve 106 controls the exhaust of hydraulic fluid from the upper side of the piston to control upward movement of the piston within a respective cylinder 98. The number of hydraulic cylinders will be equal to the number of slides 84.

When the press ram 46 is in its fully raised position of FIG. 1, the wheel rim 12 and the wheel disc 14 can be loaded on the apparatus 42 by being respectively seated on the wheel rim support 50 and the wheel disc support 66. The valves 106 are open and the slides 84 are gravity extended to their full extended position relative to the wheel disc ram 74, as set by pistons 100 engaging the lower end walls of the cylinders 98.

Figure 2:
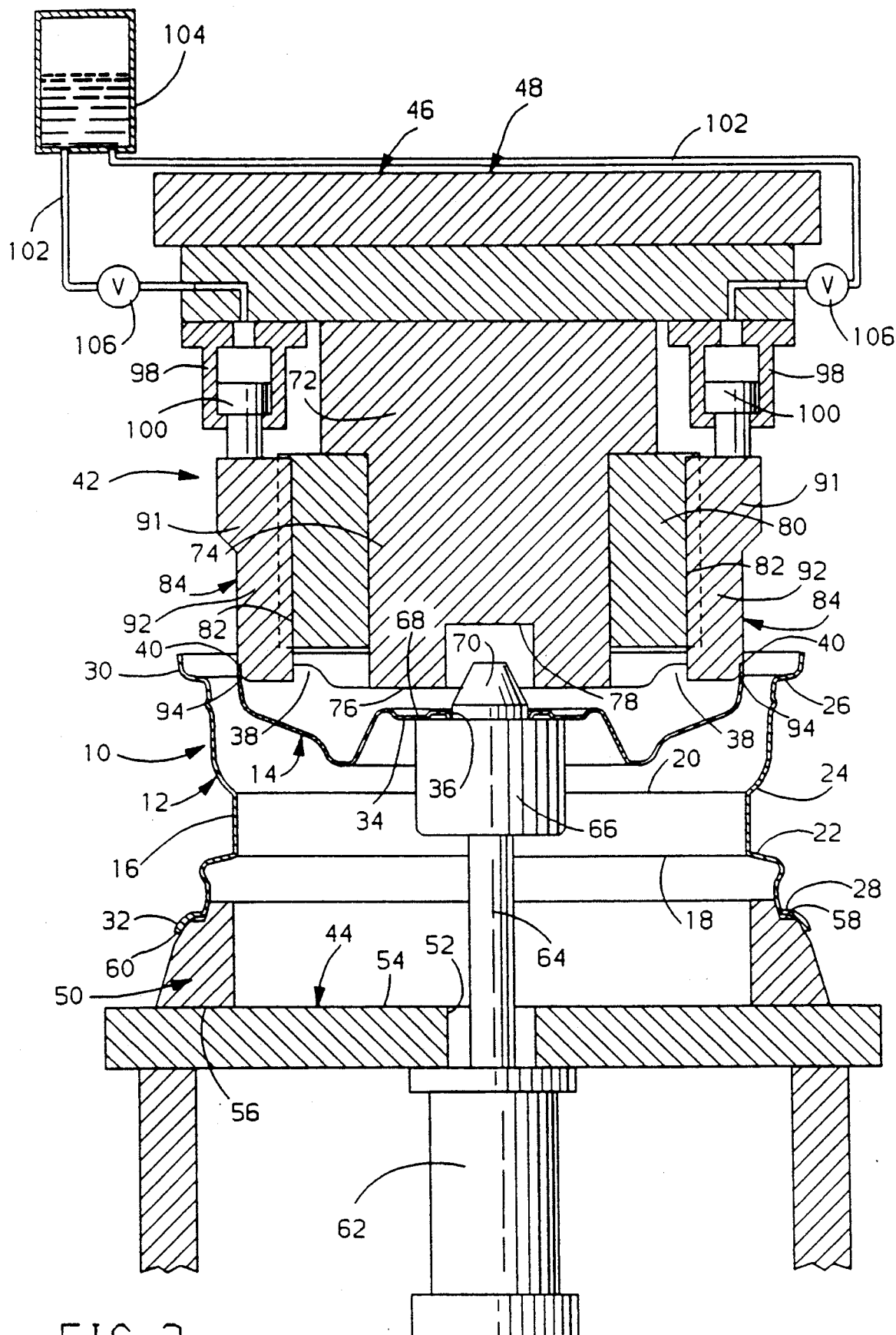
FIG. 2 is a view similar to FIG. 1 showing the apparatus in a second position in the assembly sequence.

When the press ram 46 is initially lowered toward the press bed 44 as shown in FIG. 2, the edges 96 of the grooves 94 of the slides 84 will pick up or engage the axial terminal edges 40 of respective flange portions 38 of the wheel disc 14. The edges 96 can engage their respective edges 40 at the same time or at varying times depending whether the edges 40 lie in the same horizontal plane or in parallel horizontal planes due to manufacturing tolerances. Normally, wheel disc specified tolerances do not require the edges 40 to be coplanar.

Figure 3:
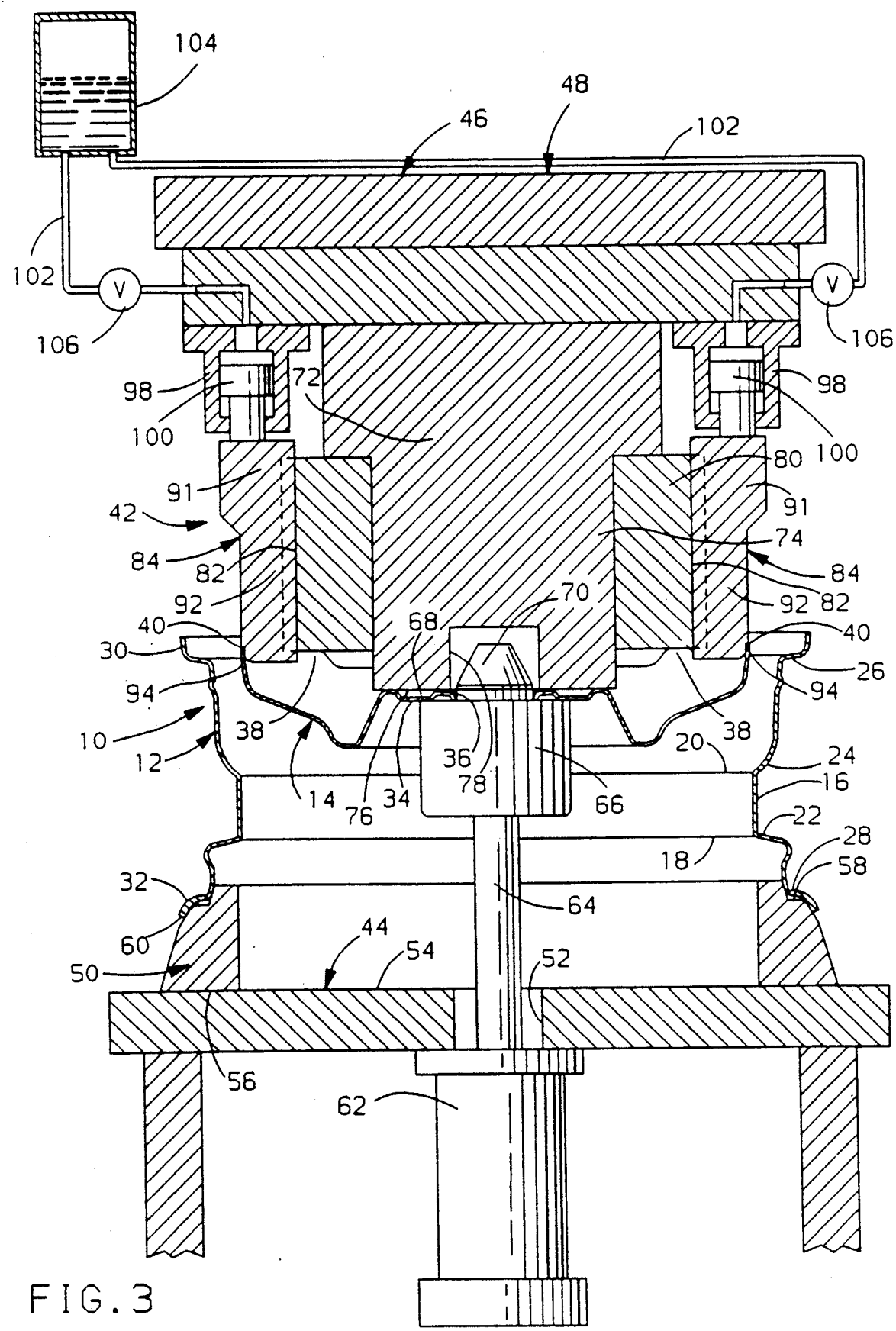
FIG. 3 is a view similar to FIG. 1 showing the apparatus in a third position in the assembly sequence.

As the press ram 46 continues to be lowered and valves 106 remain open, as shown in FIG. 3, the engagement of slides 84 with edges 40 of the flange portions 38 retracts or adjusts the positions of the slides relative to the wheel disc ram 74 as pistons 100 move upwardly within cylinders 98. The pilot 70 of the wheel disc support 66 will enter the bore 78 as the lower surface 76 of the wheel disc ram 74 engages the upper or axially inner surface of the wheel disc center portion 34. This engagement clamps the wheel disc center portion 34 against the wheel disc support 66 and maintains the center portion 34 in a plane parallel to the horizontal and to that of the wheel rim edge 60.

The valves 106 are now closed to fix the position of the slides 84 relative to the wheel disc ram 74 and unitize the slides and the wheel disc ram. Since hydraulic fluid is incompressible, no further retraction of slides 84 relative to the wheel disc ram 74 or movement of pistons 100 within cylinders 98 can occur. The position of the center portion 34 of the wheel disc relative to the flange portions 38 thereof is thus fixed and no flexing, twisting or torsional movement of the center portion 34 relative to the flange portions 38 can thereafter occur, either during force fitting of the wheel disc within the wheel rim or after such assembly due to metal springback.

Figure 4:
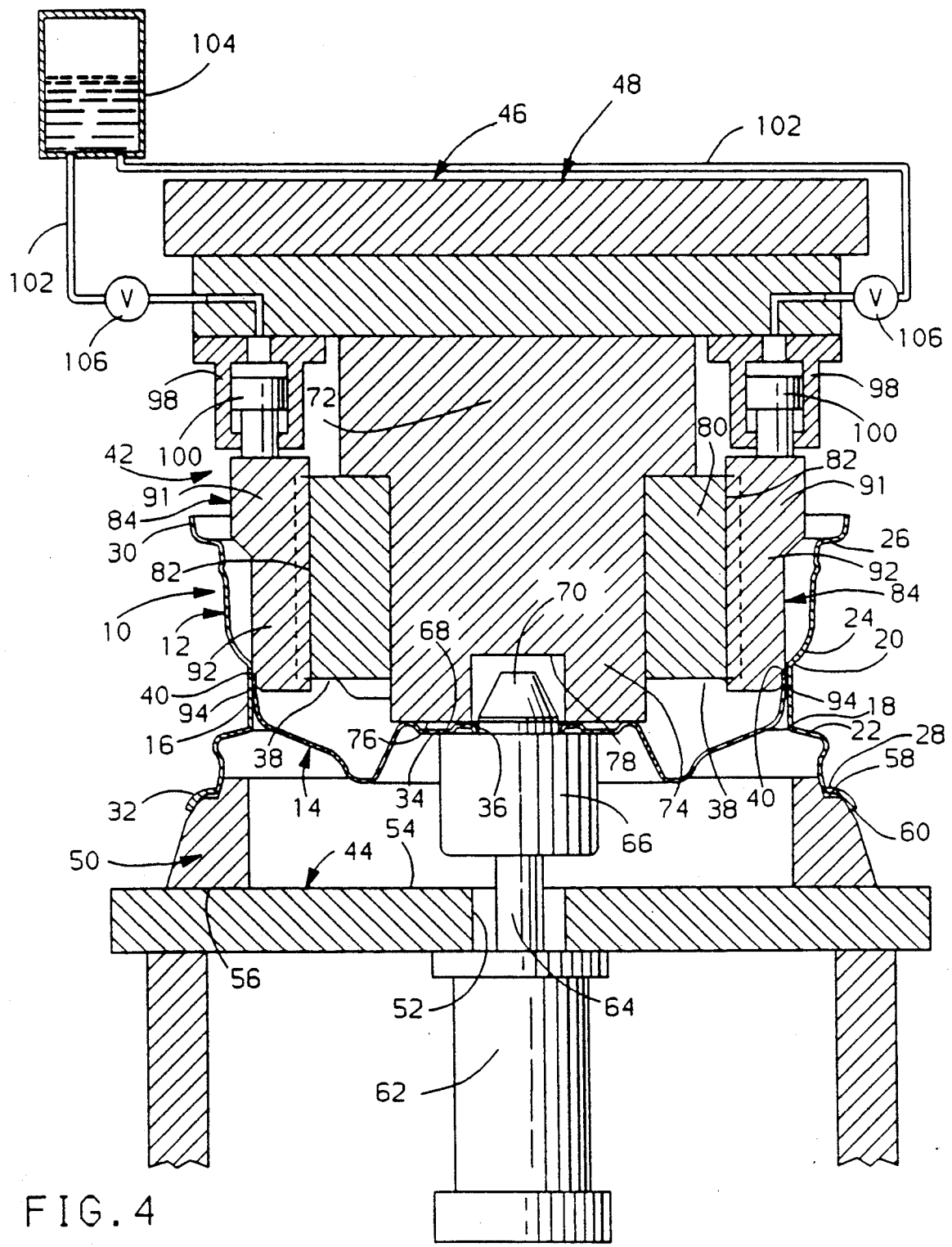
FIG. 4 is a view similar to FIG. 1 showing the apparatus in a fourth position in the assembly sequence; and, FIG. 5 is a sectional view taken along line 5—5 of FIG. 1.

Thereafter, as can be see from a comparison of FIGS. 3 and 4, continued lowered movement of the press ram 46 assembles the wheel disc 14 within the wheel rim 12 as the slides 84 and the wheel disc ram 74 contemporaneously apply a uniform force to the center portion 34 and the flange portions 38 and force fit the flange portions 38 within the drop center flange 16. This force fitting occurs with the center portion 34 remaining clamped between the wheel disc support 66 and the wheel disc ram 74 and thereby being located in a horizontal plane parallel to that of the wheel rim edge 60. The unitized slides 84 and wheel disc ram 74 fix the position of the center portion 34 and the flange portions 38 relative to each other against any increased frictional resistance forces which result from galled or out of round areas of the drop center flange 16 and/or the flange portions 38 or dirt or grit thereon. Thus, no twisting, flexing, or torsional movement of the center portion 34 relative to the flange portions 38 of the wheel disc 14 can occur during the force fitting of the wheel disc 14 within the wheel rim 12.

The lower portions 92 of the slides 84 do not engage the drop center flange 16 as the slides 84 force fit the flange portions 38 within the drop center flange 16.

Should the rim 12 be out of round or should the flange 32 not initially lie in surface to surface engagement with the shaped portion 58 of wheel rim support 50, the initial engagement of the flange portions 38 with the drop center flange 16 will force the flange 32 to conform to the shape of portion 58 of support 50 and thereby forcibly locate flange 60 in parallel planar relationship to surface 54.

Once the force fitting is completed, ram 46 is raised to its FIG. 1 position and the force fitted wheel disc 10 is removed from the support 66. The valves 106 are opened and the support 66 returns to its FIG. 1 position so that the apparatus 42 is ready for the next wheel disc to be assembled.

After a wheel disc 10 is assembled, the wheel disc and wheel rim remain in their parallel planar relationship since there is no metal springback to twist or distort either relative to the other.

The movement of the press ram 46 from its FIG. 3 position, wherein the wheel disc ram 74 engages the center portion 34, through its FIG. 4 position, after force fitting of the wheel disc 14 within the wheel rim 12 is completed, is continuously resisted by the air cylinder 62. The resistance force of the air cylinder will increase as the piston thereof is forced within the cylinder thereof against the compressed air enclosed therein.

Since the wheel disc center portion 34 and flange portions 38 cannot twist or flex relative to each other during the force fitting operation, the interference dimensions between the drop center flange 16 and the flange portions 38 can be increased to increase wheel durability. Additionally, such increased interference dimensions permit the wheel rim to be made of lighter gauge metal.

Thus, this invention provides an apparatus for force fitting a wheel disc within a wheel rim to provide a vehicle wheel with minimum lateral runout.

The embodiments of the invention in which an exclusive property or privilege is claimed are defined as follows:

1. In combination with a wheel disc having a center portion lying in a radial plane transverse of the axis thereof and having a plurality of axially extending radially facing generally circular flange portions having axial terminal edges, and a wheel rim including an axially extending radially facing generally circular flange receiving the flange portions of the wheel disc in face to face relationship, an apparatus for force fitting the flange portions of the wheel disc within the flange of the wheel rim in face to face relationship and locating the radial plane of the wheel disc center portion parallel to a radial plane transverse of the wheel rim flange, comprising, support means supporting the wheel rim and fixing the position of the radial plane of the wheel rim flange, first means movably mounted on the support means and seating the wheel disc and (1) locating the plane thereof generally parallel to the transverse radial plane of the wheel rim flange, and, (2) locating the annular flange portions of the wheel disc in axially extending relationship to the wheel rim, second means movable axially of the wheel disc and wheel rim and normal to the respective planes thereof, operating means operable to (1) initially move the second means into engagement with the center portion of the wheel disc, and, (2) subsequently move the wheel disc and first means as a unit axially toward the wheel rim while maintaining the plane of the center portion of the wheel disc parallel to the transverse radial plane of the wheel rim flange, a plurality of third means mounted on the second means for movement therewith and movement independently thereof, each third means moving independently of the second means into engagement with a respective axial terminal edge of an annular flange portion of the wheel disc as the second means moves into engagement with the center portion of the wheel disc, means operable to lock the third means against movement independently of the second means upon engagement of the second means with the center portion of the wheel disc and engagement of the third means with the axial edges of respective flange portions of the wheel disc to thereby unitize the second and third means and fix the relationship of the center portion and annular flange portions of the wheel disc, subsequent movement of the second means and the third means unitized therewith toward the wheel rim by the operating means force fitting the flange portions of the wheel disc within the flange of the wheel rim while maintaining the transverse plane of the wheel rim flange and the plane of the center portion of the wheel disc parallel to each other and maintaining the center portion of the wheel disc and the flange portions thereof in fixed relationship.

2. In combination with a wheel disc having a center portion lying in a radial plane thereof and having a plurality of axially extending radially facing flange portions having axial terminal edges, and a wheel rim including a terminal flange lying in a radial plane of the wheel rim and an axially extending radially facing drop center flange for receiving the axially extending radially facing annular flange portions of the wheel disc in face to face relationship, an apparatus for force fitting the flange portions of the wheel disc within the drop center flange of the wheel rim in face to face relationship and locating the radial planes of the wheel rim and wheel disc in parallel relationship, comprising, support means supporting the wheel rim and fixing the position of the radial plane of the wheel rim, first means seating one side of the center portion of the wheel disc and (1) locating the radial plane thereof parallel to the radial plane of the wheel rim, and, (2) locating the flange portions of the wheel disc in axially extending relationship to the wheel rim, second means movable axially of the wheel disc and wheel rim and normal to the respective radial planes thereof, operating means operable to (1) initially move the second means into engagement with the opposite side of the center portion of the wheel disc to hold the one side of the wheel disc against the first means, and, (2) subsequently move the wheel disc and first means as a unit axially toward the wheel rim while maintaining the plane of the center portion of the wheel disc parallel to the radial plane of the wheel rim, a plurality of third means mounted on the second means for movement therewith and movement independently thereof, each third means moving independently of the second means into engagement with a respective axial terminal edge of an annular flange portion of the wheel disc as the second means moves into engagement with the center portion of the wheel disc, means operable to lock the third means against movement independently of the second means upon engagement of the second means with the opposite side of the center portion of the wheel disc and engagement of the third means with the axial edges of the annular flange portions of the wheel disc to thereby unitize the second and third means and fix the relationship of the center portion and flange portions of the wheel disc, subsequent movement of the second means and third means unitized therewith toward the wheel rim by the operating means force fitting the flange portions of the wheel disc within the flange of the wheel rim while maintaining the plane of the wheel rim flange and the plane of the center portion of the wheel disc parallel to each other and maintaining the center portion of the wheel disc and the flange portions thereof in fixed relationship.

3. In combination with a wheel disc having a center portion lying in a plane radially of the axis thereof and a plurality of axially extending radially facing annular flange portions having axial terminal edges spaced axially of the radial plane of the center portion, and a wheel rim including an axially extending radially facing flange for receiving the flange portions of the wheel disc in face to face relationship, an apparatus for force fitting the flange portions of the wheel disc within the flange of the wheel rim in face to face relationship and locating the radial plane of the wheel disc center portion parallel to a radial plane transverse of the wheel rim, comprising, support means supporting the wheel rim and fixing the position of the transverse radial plane of the wheel rim, first means movably mounted on the support means and defining a plane parallel to the transverse radial plane of the wheel rim, the first means seating the center portion of the wheel disc to (1) locate the plane of such center portion generally coplanar to the plane of the first means and parallel to the transverse radial plane of the wheel rim and, (2) locating the flange portions of the wheel disc in axially outwardly extending relationship to the wheel rim, means resisting movement of the first means relative to the fixed support means, second means movable axially of the wheel disc and wheel rim flange and normal to the radial planes thereof, operating means operable to move the second means toward the support means to (1) initially move the second means into engagement with the center portion of the wheel disc, and, (2) subsequently move the wheel disc and first means as a unit therewith axially toward the wheel rim against the resistance of the resisting means while maintaining the plane of the center portion of the wheel disc parallel to the transverse radial plane of the wheel rim, a plurality of third means mounted on the second means for movement therewith and movement independently thereof, each third means being gravity extended and forcefully retracted independently of the second means, each third means engaging a respective axial terminal edge of a flange portion of the wheel disc during movement of the second means moves into engagement with the center portion of the wheel disc, means operable to lock each third means against movement independently of the second means upon engagement of the second means with the center portion of the wheel disc to unitize the second and third means and maintain the center portion of the wheel disc and flange portions thereof in fixed relationship, subsequent movement of the second means and the third means unitized therewith toward the wheel rim by the operating means force fitting the flange portions of the wheel disc within the flange of the wheel rim while maintaining the transverse plane of the wheel rim flange and the plane of the center portion of the wheel disc parallel to each other.

4. The combination recited in claim 3 wherein the means operable to lock each third means against movement independently of the second means includes a source of hydraulic pressure fluid operable to resist retraction movement of the third means relative to the second means.

5. In combination recited in claim 3 wherein the means resisting movement of the first means includes a source of compressible pressure fluid.

6. The combination recited in claim 3 including hydraulic piston and cylinder means mounting the third means on the second means and a source of hydraulic pressure fluid resisting movement of the piston within the cylinder in a direction to retract the third means.

* * * * *